(12) United States Patent
Dyson et al.

(10) Patent No.: US 10,443,396 B2
(45) Date of Patent: Oct. 15, 2019

(54) TURBINE COMPONENT COOLING HOLES

(71) Applicant: GENERAL ELECTRIC COMPANY, Schenectady, NY (US)

(72) Inventors: Thomas Earl Dyson, Niskayuna, NY (US); Aaron Ezekiel Smith, Montgomery, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 485 days.

(21) Appl. No.: 15/180,553

(22) Filed: Jun. 13, 2016

(65) Prior Publication Data
US 2017/0356295 A1    Dec. 14, 2017

(51) Int. Cl.
*F01D 5/18*    (2006.01)

(52) U.S. Cl.
CPC .......... *F01D 5/186* (2013.01); *F05D 2240/12* (2013.01); *F05D 2250/324* (2013.01); *Y02T 50/676* (2013.01)

(58) Field of Classification Search
CPC .......... F01D 5/186; F01D 5/187; F01D 5/188; F01D 5/189; F05D 2240/126; F05D 2240/127; F05D 2260/22141; F05D 2260/2212
USPC .................................. 416/96 R, 97 R, 231 R
See application file for complete search history.

(56) References Cited

U.S. PATENT DOCUMENTS

| | | | |
|---|---|---|---|
| 5,326,224 A | 7/1994 | Lee et al. | |
| 6,923,247 B1 | 8/2005 | Ferber et al. | |
| 7,997,868 B1 | 8/2011 | Liang | |
| 8,092,177 B2 * | 1/2012 | Liang | F01D 5/186 416/231 R |
| 8,328,517 B2 * | 12/2012 | Liang | F01D 5/186 416/231 R |
| 8,683,814 B2 | 4/2014 | Xu | |
| 8,777,571 B1 | 7/2014 | Liang | |
| 8,978,390 B2 | 3/2015 | Levasseur et al. | |
| 2013/0209227 A1 | 8/2013 | Xu | |

(Continued)

OTHER PUBLICATIONS

Saumweber, et al; "Free-Stream Turbulence Effects on Film Cooling with Shaped Holes," ASME Turbo Expo 2002: Power for Land, Sea, and Air, Heat Transfer, Jun. 3-6, 2002, pp. 41-49, vol. 3: Turbo Expos 2002, Parts A and B, Amsterdam, The Netherlands.

(Continued)

*Primary Examiner* — Jason D Shanske
*Assistant Examiner* — Maxime M Adjagbe
(74) *Attorney, Agent, or Firm* — Christopher R. Carroll; The Small Patent Law Group LLC (57) ABSTRACT

A turbine component includes an internal surface, an external surface and a cooling hole. The cooling hole includes an inlet disposed on the internal surface, an outlet disposed on the external surface and a flow passage in fluid communication between the inlet and outlet. The flow passage includes a metering section extending from the inlet to a metering end, a diffusion zone extending from the metering end to the outlet, and a hooded region defined by a portion of the diffusion zone covered by a hood. The cooling hole also includes a vane extending across the flow passage, wherein a portion of the vane is disposed within the hooded region.

16 Claims, 7 Drawing Sheets

(56) References Cited

U.S. PATENT DOCUMENTS

2016/0008889 A1   1/2016 Xu
2016/0024937 A1   1/2016 Xu

OTHER PUBLICATIONS

Leblanc et al; "Effect of Hole Exit Shaping on Film Cooling Performance for Tripod Hole Injection Over a Flat Surface," ASME Turbo 2013: Turbine Technical Conference and Exposition, Film Cooling, Jun. 3-7, 2013, p. 10, vol. 3B: Heat Transfer, San Antonio, Texas.

* cited by examiner

TURBINE COMPONENT COOLING HOLES

TECHNICAL FIELD

The present description relates generally to gas turbine engines. More specifically, the present invention relates to cooling holes in turbine components for providing film coolant.

BACKGROUND

A gas turbine, also called a combustion turbine, is a type of internal combustion engine. It has an upstream rotating compressor coupled by a shaft to a downstream turbine with a combustion chamber in between. In operation fresh atmospheric air flows through the compressor that brings it to higher pressure. Energy is then added by spraying fuel into the air and igniting it in the combustion chamber so that the resulting combustion generates a high-temperature flow. This high-temperature high-pressure gas enters the turbine, where it expands down to the exhaust pressure, producing shaft work output in the process. The turbine shaft work is used to drive the compressor and other devices. The energy that is not used for shaft work comes out in the exhaust gases at either a high temperature or a high velocity. Gas turbines are used to provide power to aircraft, trains, ships, electric generators, tanks and the like.

Gas turbine designers have constantly endeavored to increase the combustion chamber exit temperatures and turbine inlet temperatures. As such temperatures increase, improved efficiency and reduced fuel consumption can be achieved. Unfortunately, such higher temperatures jeopardize the integrity of high-pressure turbine components such as combustion chamber (or combustor) liners, nozzle guide vanes, shrouds and especially the turbine blades.

Turbine blades typically include airfoil sections, due to their airfoil-like shape, and base sections for rigidly mounting the turbine blades to a rotor of the turbine section of a gas turbine engine. The blades are responsible for extracting energy from the high temperature, high pressure gas produced by the combustor. The turbine blades are often the limiting component of gas turbines since they are so difficult to cool and are often subjected to temperatures that exceed the melting point of the turbine blades.

To survive in such a difficult environment, turbine blades, and other turbine components, require careful design of external and internal cooling features. Among the most important of these features are thin film cooling holes designed for thin film cooling of the turbine components.

In film cooling, pressurized cool air is bled from the compressor stage, ducted to the hollow internal chambers of the turbine components, and discharged through multiple small cooling holes in the component walls (or structure). This air provides a thin, cool, insulating blanket (or film) along the external surface of the turbine component.

Unfortunately, the more coolant (i.e., cooling air) required for the compressor to produce, the less efficient the gas turbine engine. Additionally, prior art cooling holes can only diffuse the coolant flowing out of the exits of the cooling holes at diffusion angles of about 20 to 30 degrees. As such, many cooling holes are required to properly cover the surfaces of turbine components, which leads to variations in the coolant film thickness and integrity.

Additionally, the smaller the diffusion angles, the more cooling holes will be required per unit surface area. The more the number of cooling holes needed to cool the turbine components of a gas turbine engine, the greater the mass of compressed air will be consumed by those cooling holes, and the less efficient the gas turbine engine will be.

Accordingly, there is a need for film cooling holes that provide more diffuse coolant at wider diffusion angles than prior art cooling holes. There is also a need to use less cooling holes per unit surface area of a turbine component. There is also a need to provide cooling holes that consume less mass flow of compressed air from the compressor than the prior art.

BACKGROUND

Aspects of the present invention provide turbine components having cooling holes that overcome the limitations of the conventional cooling holes for turbine components are disclosed. Though some aspects of the present description may be directed toward the fabrication of components for turbine engines aspects of the present system may be employed in the fabrication of any component on any industry, in particular, those components for turbines in general.

The cooling holes of the present invention provide for a more even and wider distribution of coolant over an exterior surface of a turbine component so that fewer coolant holes may be used to protect the exterior surface of the turbine component. For example, the cooling holes can provide a distribution of coolant that is more than two times wider than prior art cooling holes.

A turbine component in accordance with one or more aspects of the present invention includes an internal surface, an external surface and a cooling hole. The cooling hole includes an inlet disposed on the internal surface, an outlet disposed on the external surface and a flow passage in fluid communication between the inlet and outlet. The flow passage includes a metering section extending from the inlet to a metering end, a diffusion zone extending from the metering end to the outlet, and a hooded region defined by a portion of the diffusion zone covered by a hood. The cooling hole also includes a vane extending across the flow passage, wherein a portion of the vane is disposed within the hooded region.

In another aspect of the present invention a turbine component includes an internal surface, an external surface and a cooling hole. The cooling hole includes an inlet disposed on the internal surface, an outlet disposed on the external surface and a flow passage in fluid communication between the inlet and outlet. The flow passage includes a metering section extending from the inlet to a metering end, a diffusion zone extending from the metering end to the outlet, and a hooded region defined by a portion of the diffusion zone covered by a hood. The cooling hole also includes a plurality of vanes extending across the flow passage, wherein a portion of each vane is disposed within the hooded region.

These and other aspects, features, and advantages of this invention will become apparent from the following detailed description of the various aspects of the present invention taken in conjunction with the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features and advantages of the present invention will be readily understood from the following detailed description of aspects of the invention taken in conjunction with the accompanying drawings in which:

DETAILED DESCRIPTION

Certain exemplary embodiments will now be described to provide an overall understanding of the principles of the structure, function, manufacture, and use of the methods, systems, and devices disclosed herein. One or more examples of these embodiments are illustrated in the accompanying drawings. Those skilled in the art will understand that the methods, systems, and devices specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

FIGS. 1-10 illustrate various exemplary embodiments of a cooling hole for a turbine component in accordance with the present invention. The cooling holes provide for a more even and wider distribution of coolant over an exterior surface of a turbine component so that fewer coolant holes may be used to protect the exterior surface of the turbine component. The cooling holes can also consume less mass flow of compressed air from the compressor than prior art cooling holes.

Figure 1:
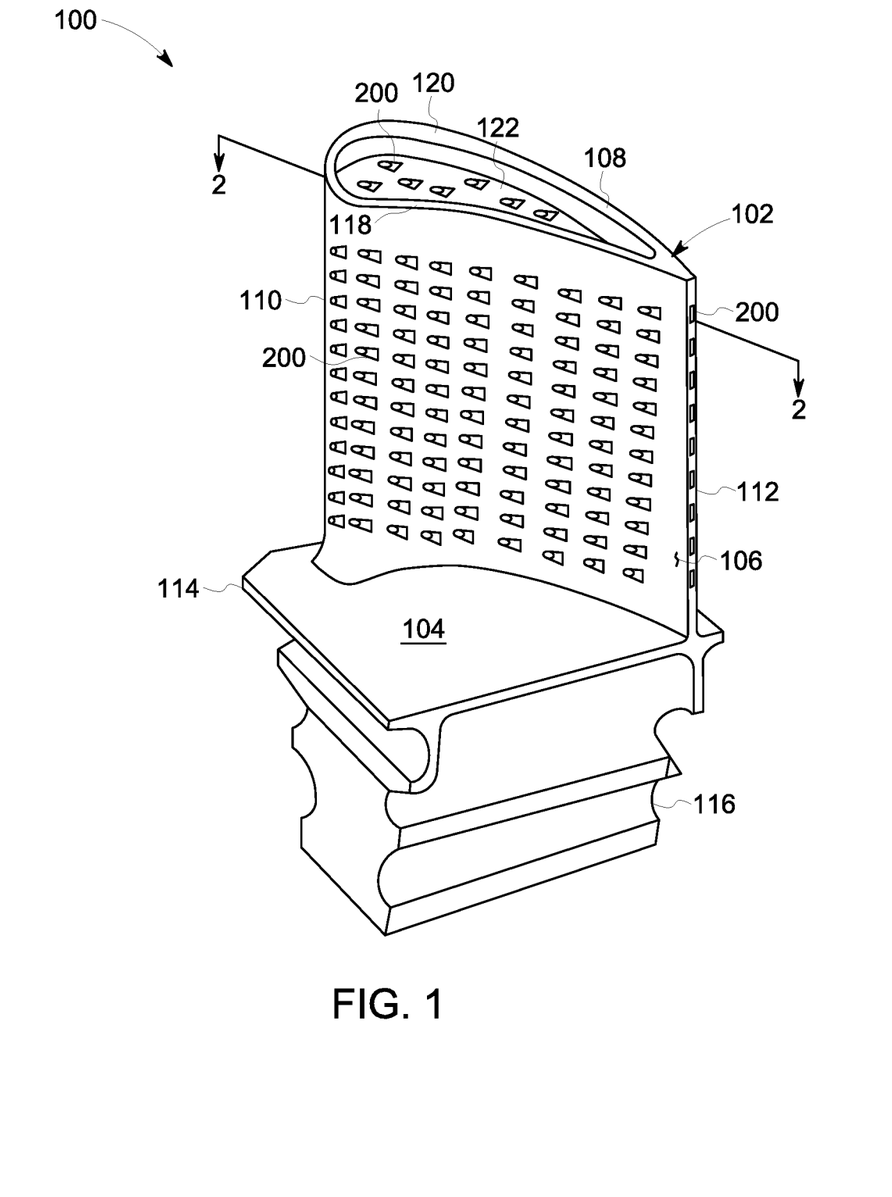
FIG. 1 is a perspective view of a turbine component (more specifically an air foil) having cooling holes in accordance with the present invention.
Figure 2:
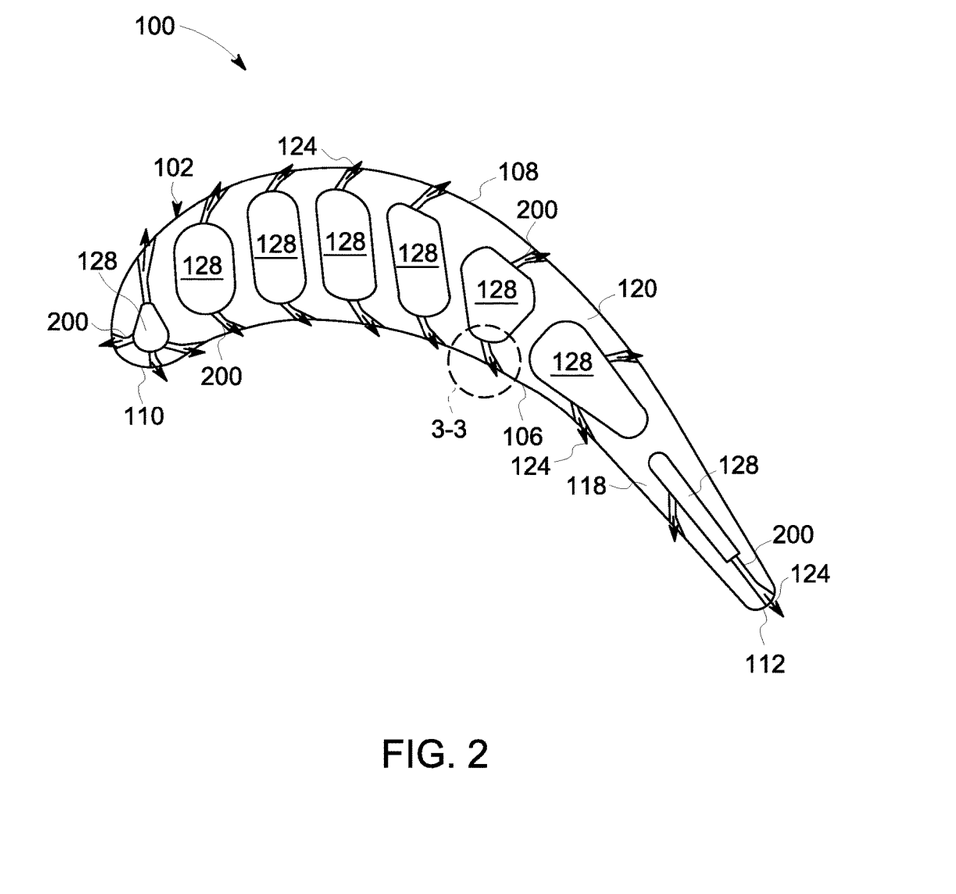
FIG. 2 is a side view of the turbine component taken along the line 2-2 of FIG. 1 in accordance with the present invention.

Referring to FIGS. 1 and 2, perspective and cross-sectional views of an exemplary embodiment of a turbine component is illustrated at 100. More specifically the turbine component 100 is a turbine blade for a gas turbine engine (not shown). During operation, the turbine blade 100 is exposed to a hot gas flow from the gas turbine engine. The hollow blade 100 includes an airfoil 102 rigidly mounted to a base 104. The airfoil 102 includes respective pressure and suction sides 106, 108 and leading and trailing edges 110, 112. The base 104 includes a platform 114, upon which the airfoil 102 is rigidly mounted, and a dovetail root 116 for attaching the blade 100 to a rotor (not shown) of a turbine (not shown) of the gas turbine engine.

The airfoil 102 has opposite side walls 118, 120 defining the pressure and suction sides 106, 108 of the airfoil 102 which merge together at the leading and trailing edges 110, 112 of the airfoil 102. The distal end of the airfoil 102 also has an end cap 122 which closes the distal ends of the side walls 118, 120. The side walls 118, 120, leading and trailing edges 110, 112, and end cap 122 of the airfoil 102 contain a plurality of small apertures or cooling holes 200 which permit passage and exit of cooling air from the interior to the exterior of the airfoil 102.

Pressurized cooling air 124, from the compressor (not shown) of the gas turbine engine, flows into and upwardly through the base 104 of the blade 100 to the airfoil 102. The airfoil 102 includes a plurality of interior spaced ribs 126 (best seen in FIG. 2) which extend across the hollow interior of the airfoil 102 and rigidly interconnected with the side walls 118, 120 so as to define a series of interior cavities 128 in the interior of the airfoil 102. The cooling air (or coolant) 124 flows from the interior of the airfoil 102 and exits through the cooling holes 200 in the side walls 118, 120, leading and trailing edges 110, 112, and end cap 122 of the airfoil 102.

Figure 3A:
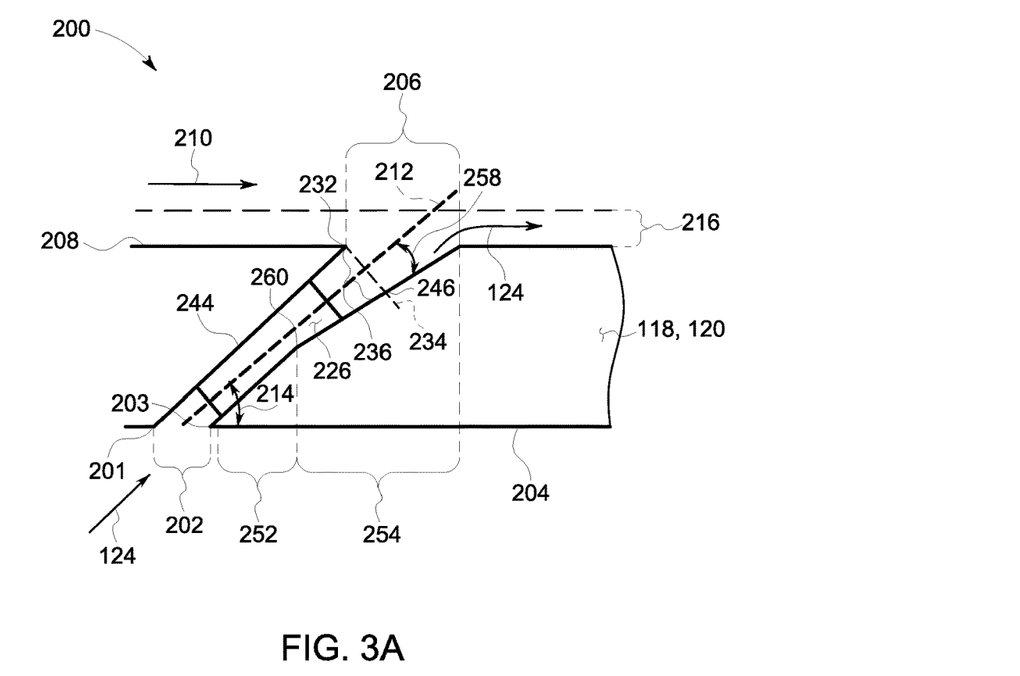
FIG. 3A is an enlarged cross-sectional side view of a cooling hole disposed in the circular area 3-3 of FIG. 2 in accordance with the present invention.
Figure 3B:
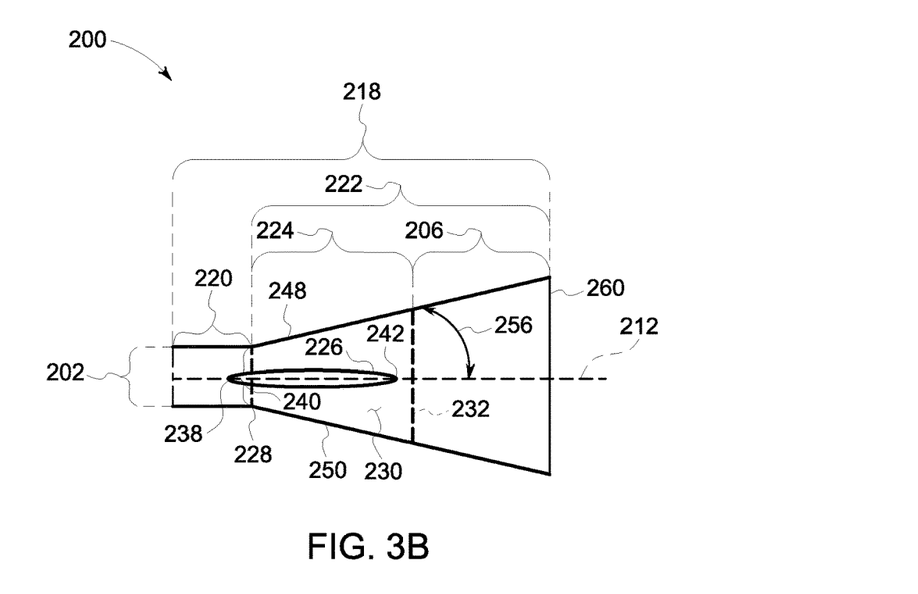
FIG. 3B is a top view of FIG. 3A in accordance with the present invention.

Referring to FIGS. 3A and 3B, in accordance with the present invention, an enlarged cross-sectional side view (FIG. 3A) and a top view (FIG. 3B) of the cooling hole 200 disposed in the circular area 3-3 of FIG. 2 are respectively illustrated. In this exemplary embodiment the cooling holes 200 are shown extending through the sidewalls 118, 120 of the airfoil 102. However, the cooling holes 200 can extend through any sidewall (or any structure) of any turbine component having an interior surface in contact with pressurized coolant and an exterior surface in contact with mainstream hot gas from a gas turbine engine.

The cooling holes 200 extend through the sidewalls 118, 120 between an inlet 202 disposed on an internal surface 204 and an outlet 206 disposed on an external surface 208 of the side walls 118, 120 being respectively exposed to cooling air flow 124 and hot mainstream gas flow 210. The inlet 202 has an upstream end 201 and a downstream end 203 relative to the direction of the downstream flow of the hot mainstream gas, being represented by arrow 210.

For purposes of clarity, the terms "upstream" and "downstream" are meant as convenient indicators of positioning relative to a predetermined flow direction of fluid, for example the predetermined flow direction of mainstream gas or cooling air. However, such indicators do not require fluid to be actually flowing.

The cooling holes 200 have a central axis 212 that is typically axially aligned at an acute incline angle 214 relative to the external surface 208. Incline angle 214 directs the airflow 124 in the direction of the downstream flow of the hot mainstream gas 210. The air flow 124 then exits the cooling hole 200 at the outlet 206 and passes over and along the external surface 208. The air flow 124 cools the external surface 208 of the airfoil 102 by entraining the cooling air 124 exiting the holes 200 within a film (or boundary layer) 216 of low velocity gas that exists between the hot combustion mainstream gases 210, which are traveling at high velocity, and the external surface 208.

A flow passage 218 is in fluid communication between the inlet 202 and the outlet 206. The flow passage 218 directs the flow of pressurized cooling air 124 through the cooling hole 200 from the inlet 202 to the outlet 206. The flow passage 218 includes a metering section, 220, a diffusion zone 222, and a hooded region 224 covering a portion of the diffusion zone 222. At least one vane 226 extends across the flow passage 218 for splitting the flow of cooling air 124. At least a portion of the vane 226 is disposed within the hooded region 224. As will be discussed in greater detail herein, in this particular exemplary embodiment, the vane 226 is disposed entirely within the hooded region 224 and the metering section 220.

The metering section 220 extends from the inlet 202 to a metering end 228. The metering section 220 generally has the smallest cross-sectional area that is substantially constant throughout. The metering section 220 is designed to limit (meter) the flow of cooling air 124 through the flow passage 218.

The diffusion zone 222 extends from the metering end 228 to the distal downstream end 236 of outlet 206. As will be explained in greater detail herein, the diffusion zone is designed to diffuse the flow of cooling air 124 through the flow passage 218.

The hooded region 224 is defined by a portion of the diffusion zone 222 that is covered by a hood 230. The hood begins at the metering end 228 and extends to a distal end 232. The hood distal end 232 intersects an exit plane 234 that is oriented perpendicular to the central axis 212. The cross-sectional area 236 of the flow passage 218 at the exit plane 234 defines the end of the hooded region 224.

As was mentioned earlier, in this exemplary embodiment, the vane 226 is disposed entirely within the hooded region 224 and metering section 220. In other words, it can be said that the vane is disposed within the flow passage 218 such that it does not extend beyond the exit plane 234.

In the hooded region there is no mixing of the flow of cooling air 124 with the mainstream gas flow 210. Therefore, as will be explained in greater detail herein, any portion of the vane 226 that extends into the hooded region 224 will more effectively meter, shape and generally affect the flow of cooling air 124 than vanes that are disposed entirely outside of the hooded region (i.e., beyond the exit plane 234). In the portion of the flow passage 218 between the exit plane 234 and the downstream end 260 of the outlet 206, the flow of cooling air 124 begins to mix with the mainstream gas flow 210.

An important parameter of the cooling hole 200 that significantly affects performance is the area ratio of the cooling hole 200. The area ratio of cooling hole 200 is defined as the ratio of the cross-sectional area 236 of the flow passage 218 at the exit plane 234 to the cross-sectional area of the inlet 202 taken perpendicular to the central axis 212 and intersecting the downstream end 203 of the inlet 202. Typically, the cross-sectional area of the inlet 202 taken perpendicular to the central axis 212 is considered to be functionally the same as the cross-sectional area 238 of the flow passage 218 at the metering end 228 of the metering section 220.

Basically, the velocity of the cooling air flow 124 at the outlet 206 relative to the velocity of the cooling air flow 124 at the inlet 202 is inversely proportional to the area ratio (i.e., area 236/area 238). Accordingly, the greater the area ratio of the cooling hole 200, the slower the velocity of the cooling air flow 124 at the outlet 206. When the velocity of the cooling air flow 124 at the outlet 206 is reduced, the easier it is for the cooling air flow 124 to become entrained into the boundary layer 216 and the more efficient the cooling process becomes.

One way to affect the area ratio is with the placement of vane 226. Vane 226 may include a tapered upstream end 240 and a tapered downstream end 242. It is advantageous to have a portion of the vane 226 disposed within the hooded region 218. The amount of the portion of the vane 226 within the hooded region 224 (for example, at least 50 percent of a longitudinal length of the vane 226, or entirely within the hooded region 224 and metering section 220) depends on the various design requirements of a specific application. For example, by placing the upstream end 240 into the metering section 220, the cross-sectional area 238 at the metering end 228 is reduced, therefore driving the area ratio up and the exit velocity of the cooling air 124 down. Additionally, having a portion of vane 226 disposed in the metering section helps to restrict and meter the cooling air flow 124 more accurately.

Also, in the embodiment illustrated in FIGS. 3A and 3B, the downstream end 242 of vane 226 does not extend beyond the exit plane 234. In other words, the vane 226 is disposed entirely within the hooded region 224 and metering section 220 of the flow passage 218. This has the advantage of maximizing the cross-sectional area 236 at the exit plane 234, which tends to increase the area ratio (area 236/area 238). If, on the other hand, the vane 226 were to extend beyond the exit plane 234 of the hooded region 224 or if the vane 226 were just outside of the hooded region but still in the outlet 206, then the vane 226 would act to reduce the cross-sectional area 236 and tend to drive the area ratio down.

Figure 5:
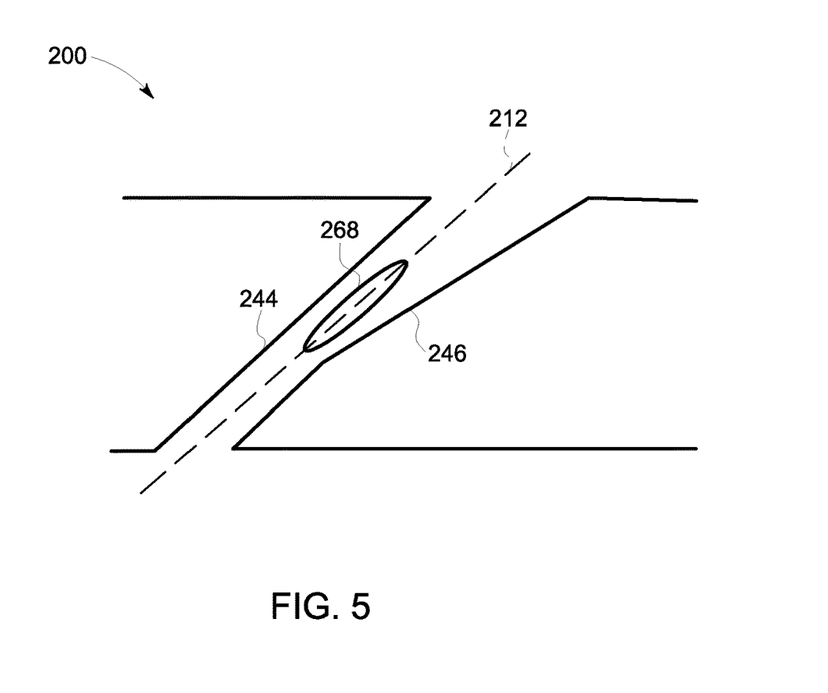
FIG. 5 is a cross-sectional view of an exemplary embodiment of a cooling hole having a forward diffusion vane in accordance with the present invention.

The cooling hole 200 also includes an upstream wall 244 and a downstream wall 246. The downstream wall 246 is disposed downstream of the upstream wall 244 relative to the flow 210 of mainstream gas. First sidewall 248 and opposing second sidewall 250 interconnect the upstream and downstream walls 244, 246 to define the flow passage 218. In this particular exemplary embodiment, the vane 226 extends longitudinally relative to the central axis 212 and laterally from the upstream wall 244 to the downstream wall 246. However (as best seen in FIG. 5), there may be applications that are advantageous for vane 226 to be oriented to extend laterally from the first side wall 248 to the second sidewall 250.

The diffusion zone 222 includes an alpha section 252 and a beta section 254. In the alpha section 252, the first and second sidewalls 248, 250 diverge only laterally at an acute alpha angle 256 relative to the central axis 212. In the alpha section 252, the upstream wall 244 and downstream wall 246 do not diverge. The alpha section induces the cooling air flow 124 to fan out and diffuse in the direction of the diverging alpha angle 256.

In the beta section 254, the sidewalls 248, 250 continue to diverge at an angle alpha 256. However, the downstream wall 246 also diverges longitudinally at an acute beta angle 258 relative to the central axis 212. The point 260 where the downstream wall 246 begins to diverge at beta angle 258 marks the end of the alpha section 252 and the beginning of the beta section 254. In the beta section 254, the cooling air flow 124 is induced to diffuse in both the directions of the diverging alpha angles 256 and the beta angle 258. Diffusion of the cooling air flow 124 in the direction of the alpha angle 256 helps to cover a larger surface area of the turbine component to be cooled and therefore helps to reduce the number of cooling holes 200 required for any given application. Diffusion of the cooling air flow 124 in the direction of the beta angle 258 helps to guide the cooling air flow 124 in the downstream direction of the mainstream hot gas flow 210 (i.e., in the stream-wise direction). Therefore, the beta angle 258 in beta section 254 helps the cooling air flow 254 turn the corner at the downstream end 260 of the outlet 206 and better entrain into the boundary layer 216.

Though this embodiment illustrates the alpha section 252 being disposed upstream of the beta section 254 relative to the cooling air flow 124, one skilled in the art would recognize that the beta section 254 could easily be located upstream of the alpha section 252. The order of alpha and beta sections 252, 254 may depend on such parameters as the specific location of the cooling hole 200 on a turbine component. Moreover, it is the inclusion of an alpha angle 256 and/or beta angle 258 that determines whether a section will induce flow in either the alpha or beta directions. Therefore, any section may have any combination of a diverging upstream wall 244 and/or downstream wall 246 with a beta angle 258, or a diverging first and/or second sidewall 248, 250 with an alpha angle 256.

However, there is a finite limit as too how large the alpha 256 and beta 258 angles can get before coolant air flow 124 near the walls becomes unstable and vortices begin to form. This is especially critical for the alpha angle 256 which is designed to induce diffusion over as large a surface area as possible in order to reduce the amount of cooling holes 200 required for any given application.

The maximum allowable alpha angle between walls in the diffusion zone 222 (including walls of any vanes in the diffusion zone 222) is known as the stall limit (or stall angle). Once the stall limit is reached, the air flow 124 stalls (or separates) and vortices form near the walls. The formation of these vortices disrupts diffusion and the cooling air flow 124 projects out one side of the outlet 206 as a jet. Once separation occurs, the boundary layer 216 is essentially lost for that particular cooling hole 200.

The inclusion of vanes of various lengths, numbers and other like arrangements can significantly affect the stall limit, as well as other advantageous parameters of cooling holes for providing film cooling of turbine components. Various advantageous exemplary embodiments of those vane arrangements are illustrated in the following FIGS. 4-10.

Figure 4:
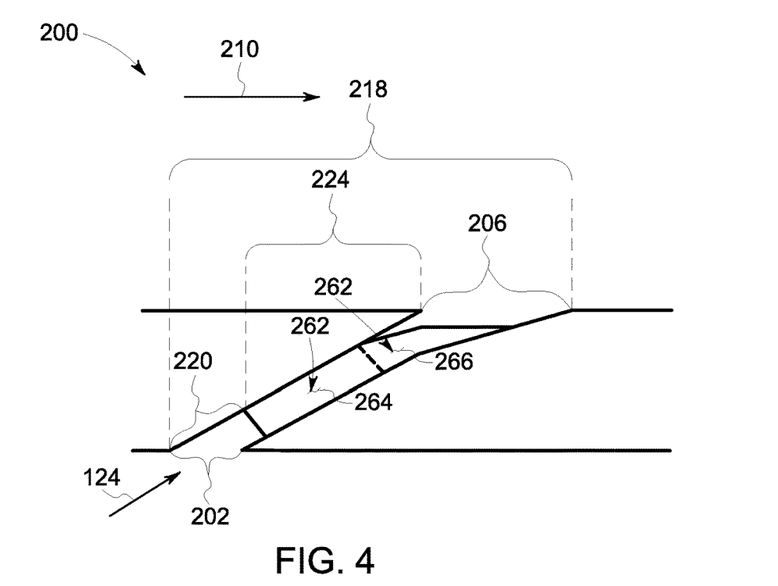
FIG. 4 is a cross-sectional view of an exemplary embodiment of a cooling hole having an exit shaping vane in accordance with the present invention.

Referring to FIG. 4, a cross-sectional view of an exemplary embodiment of a cooling hole 200 having an exit shaping vane 262 is presented. Again, cooling hole 200 includes an inlet 202 and an outlet 206 connected by a flow passage 218. Vane 262 includes a flow splitting portion 264 and a flow shaping portion 266. The flow splitting portion, much like vane 226 of FIGS. 3A and 3B, is designed for splitting the flow of cooling air 124 within the flow passage 218. The flow splitting portion 264 extends laterally across the entire flow passage 218. The flow splitting portion 264 is disposed entirely within the hooded region 224 and the metering section 202 of the flow passage 218.

The flow shaping portion 266 is designed for shaping the flow of cooling air 124 prior to reaching the exit 206 of the cooling hole 200. The flow shaping portion 266 extends beyond the hooded region 224. In other words, the flow shaping portion 266 extends beyond the exit plane 234 defining the end of the hooded region 224.

The flow shaping portion 266 helps to extend the cooling air flow 124 prior to mixing with mainstream hot gas flow 210. The flow shaping portion 266 can be used to enhance stream-wise diffusion.

Referring to FIG. 5, a cross-sectional view of an exemplary embodiment of a cooling hole 200 having a forward diffusion vane 268 is presented. Forward diffusion vane 268 extends longitudinally relative to central axis 212. Forward diffusion vane 268 extends laterally from the first sidewall 248 to the second sidewall 250 (best seen in FIG. 3B), rather than laterally from the upstream wall 244 to the downstream wall 246.

Such forward diffusion vanes 268 (sometimes referred to as horizontal vanes) are used to enhance forward streamwise diffusion. They are especially useful for leading edges 110 of airfoils 100 (best seen in FIGS. 1 and 2).

Figure 6:
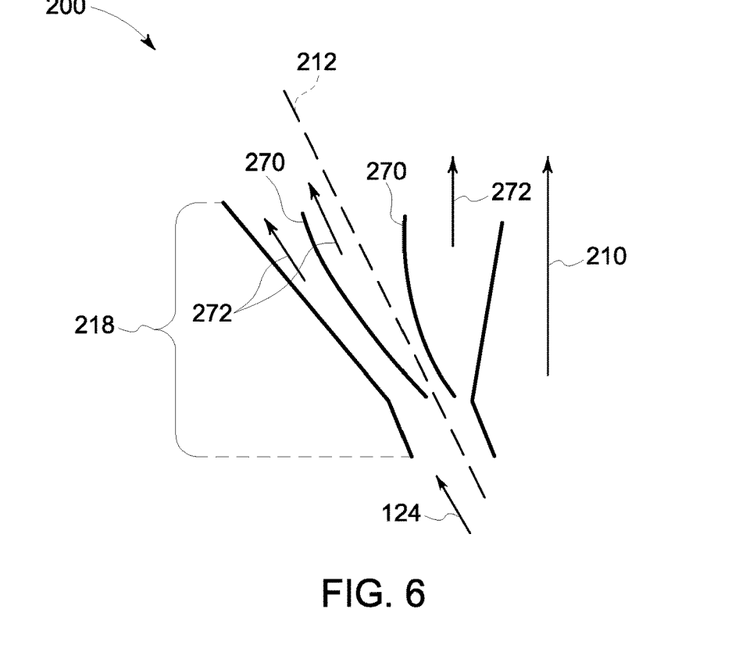
FIG. 6 is a cross-sectional view of an exemplary embodiment of a cooling hole having a pair of curved vanes in accordance with the present invention.

Referring to FIG. 6, a cross-sectional view of an exemplary embodiment of a cooling hole 200 having a pair of curved vanes 270 is presented. In this embodiment, cooling hole 200 has a central axis 212 that is oriented at an acute angle relative to the direction of flow 210 of the mainstream gas. Curved vanes 270 have an arcuate shape (i.e., includes at least one curve) to divert the flow of cooling air 124 more toward the mainstream gas flow 210 within the flow passage 218 such that the direction of the flow of cooling air 124 does not align with the central axis 212 of the cooling hole 200. Alternatively, the curved vanes 270 may include at least one acute angle instead of a curve. Such curved vanes 270 may be used to maintain equal exit areas between various sub-passages (represented by arrows 272) between the vanes 270 within the flow passage 218.

Figure 7:
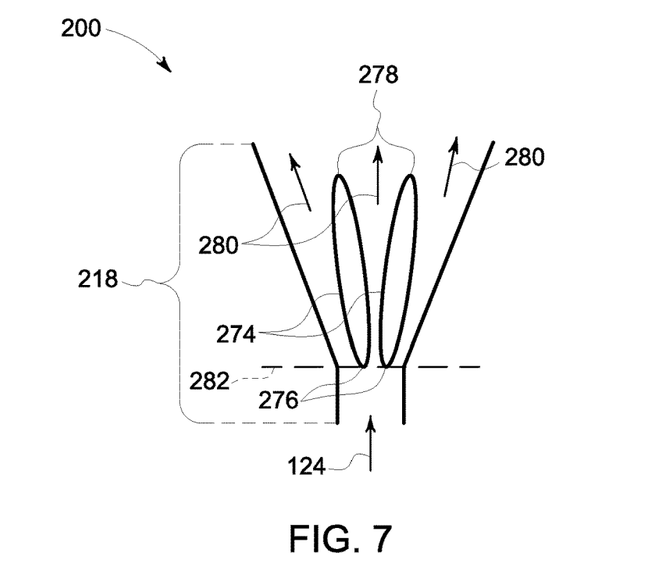
FIG. 7 is a cross-sectional view of an exemplary embodiment of a cooling hole having a plurality of vanes disposed in substantially the same flow position in accordance with the present invention.
Figure 8:
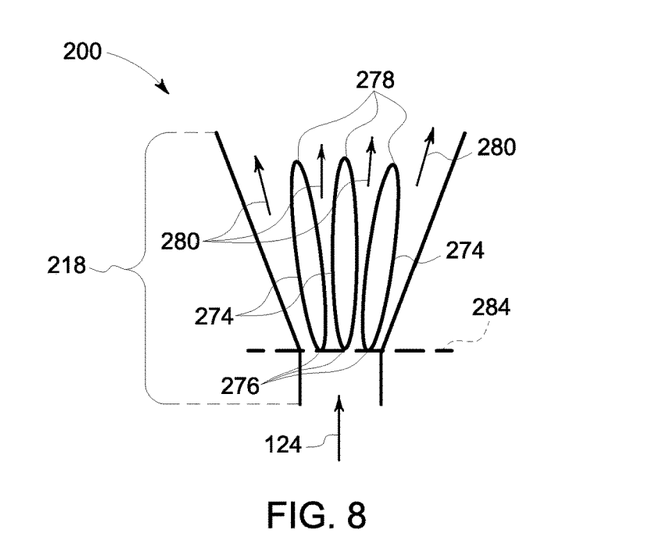
FIG. 8 is a cross-sectional view of an alternative exemplary embodiment of a cooling hole having a plurality of vanes disposed in substantially the same flow position in accordance with the present invention.

Referring to FIGS. 7 and 8, cross-sectional views of exemplary embodiments of cooling holes 200 having a plurality of vanes 274 disposed in substantially the same flow position are presented. Each vane 274 includes an upstream end 276 and a downstream end 278. The downstream ends 278 are disposed downstream of the upstream ends relative to the flow of the cooling air 124. Like vane 226, a portion of each vane 274 is disposed within the hooded region 224 (best seen in FIG. 3B).

In the embodiments illustrated in FIGS. 7 and 8, the upstream ends 276 are disposed substantially in a same stream position 282 and 284 relative to the flow 124 of the cooling air. The plurality of vanes 278 split the flow 124 of cooling air at that stream position 282, 284 into a plurality of sub-passages 280 within the flow passage 218 of cooling hole 200.

Ideally, the "same flow position" (as represented by position 282 in FIG. 7 and position 284 in FIG. 8) would be the same plane taken perpendicular to the direction of cooling air flow 124 at any point within the flow passage 218 of cooling hole 200. However, for purposes herein, the "same flow position" shall mean a position proximate enough to the same plane taken perpendicular to the direction of flow to substantially simultaneously split a single flow stream of air into a plurality of flow streams of air. At the same flow position, the flow characteristics (e.g., pressure, temperature, velocity, or the like) of the of the stream do not change significantly (for example, within plus or minus 5 percent) compared to the flow characteristics further downstream.

By adding multiple vanes 274, the total stall angle (discussed earlier with reference to FIGS. 3A and 3B) will be a function of the individual stall angles between the individual vanes 274. As a result, the total stall angle across the entire flow passage 218 will increase. In other words, the angle alpha 256 (best seen in FIG. 3B) that can be achieved before experiencing separation will be increased relative to a cooling hole without such vanes 274.

Figure 9:
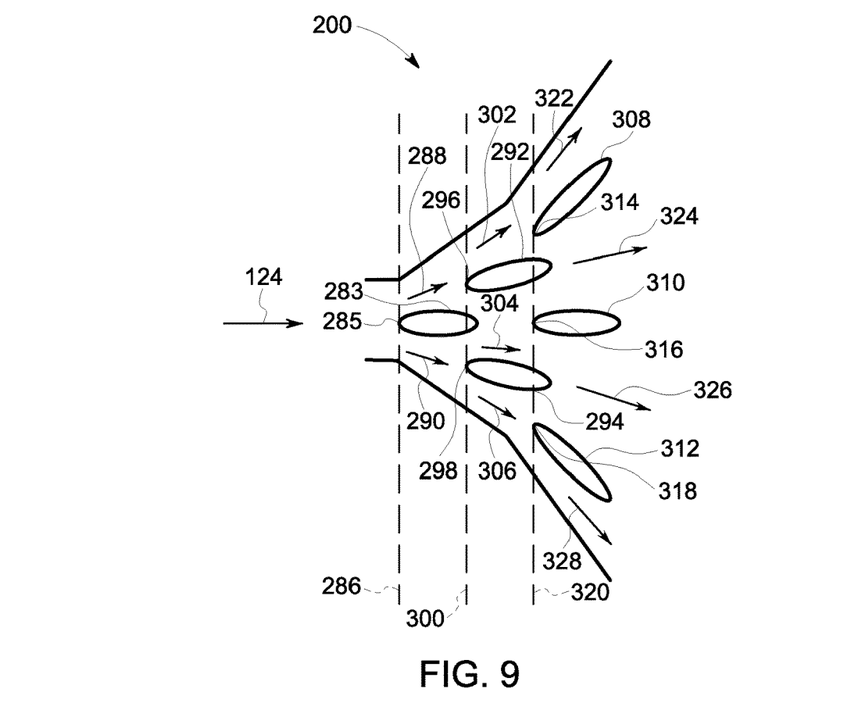
FIG. 9 is a cross-sectional view of an exemplary embodiment of a cooling hole having a bifurcated flow passage in accordance with the present invention.

Referring to FIG. 9, a cross-sectional view of an exemplary embodiment of a cooling hole 200 having a bifurcated flow passage is presented. For purposes herein, a bifurcated flow passage is where the cooling flow of air is first split at a first flow position and then later split again at a second flow position downstream to the first flow position.

More specifically in FIG. 9, the cooling hole 200 includes a first vane 283 having its upstream end 285 disposed in a first stream position 286, the first vane 283 splitting the flow of cooling air 124 at that first stream position 286 into first and second sub-passages 288, 290. The cooling hole 200 also includes second and third vanes 292, 294 having their upstream ends 296, 298 disposed in substantially a second stream position 300, the second stream position 300 being downstream of the first stream position 286 relative to the flow of cooling air 124. The second and third vanes 292, 294 split the flow of cooling air 124 at that second stream position into third 302, fourth 304 and fifth 306 sub-passages. Because the original flow of cooling air 124 has been split twice (once at stream position 286 and a second time at stream position 300) the cooling hole 200 is said to be bifurcated.

This embodiment of cooling hole 200 also includes a fourth 308, fifth 310 and sixth 312 set of vanes having their upstream ends 314, 316, 318 respectively disposed in substantially a third stream position 320. The third stream position 320 is disposed downstream of the second stream position 300 relative to the flow of cooling air 124. The fourth, fifth and sixth vanes 308, 310, 312 split the flow of cooling air 124 at that third stream position 320 into sixth 322, seventh 324, eighth 326 and ninth 328 sub-passages.

Essentially, the embodiment of FIG. 9 bifurcates the cooling hole 200 such that the air flow is split from one stream 124 at the inlet 202, to two streams 288, 290 at the first stream position 286, to three streams 302, 304, 306 at the second stream position 300 and finally to four streams 322, 324, 326, 328 at the third stream position 320.

In this embodiment, the first, second, and third vanes 283, 292, 294 are disposed entirely within the hooded region 224 and metering section 220. At least a portion of the fourth, fifth and sixth vanes 314, 316, 318 are disposed within the hooded region 224. Preferably however, the fourth, fifth and sixth vanes 314, 316, 318 are disposed entirely within the hooded region 224.

The configuration has several advantages. For example, the stall angle discussed earlier is a function of the maximum allowable angle between walls (including walls of vanes and the cooling hole) and the length of the passage (or sub-passage). Basically, as the length of a passage (or sub-passage) goes down, the stall angle increases. If the flow is bifurcated, then the length of each smaller sub-passage will determine the stall angle for that sub-passage, not the overall length of the flow passage 218. Therefore, bifurcated vanes can produce a larger stall angle (a larger overall alpha angle) than the same number of vanes used in a non-bifurcated (or fixed) configuration (such as illustrated in FIGS. 7 and 8).

With a cooling hole 200 having the configuration of FIG. 9, overall alpha angles of diffusion of potentially 70 degrees or greater are achievable, as compared to prior art alpha angles of between 20-30 degrees. Alternatively, the FIG. 9 configuration of cooling hole 200 could produce a 20-30 degree alpha angle with a shorter flow passage compared to prior art cooling holes.

Figure 10:
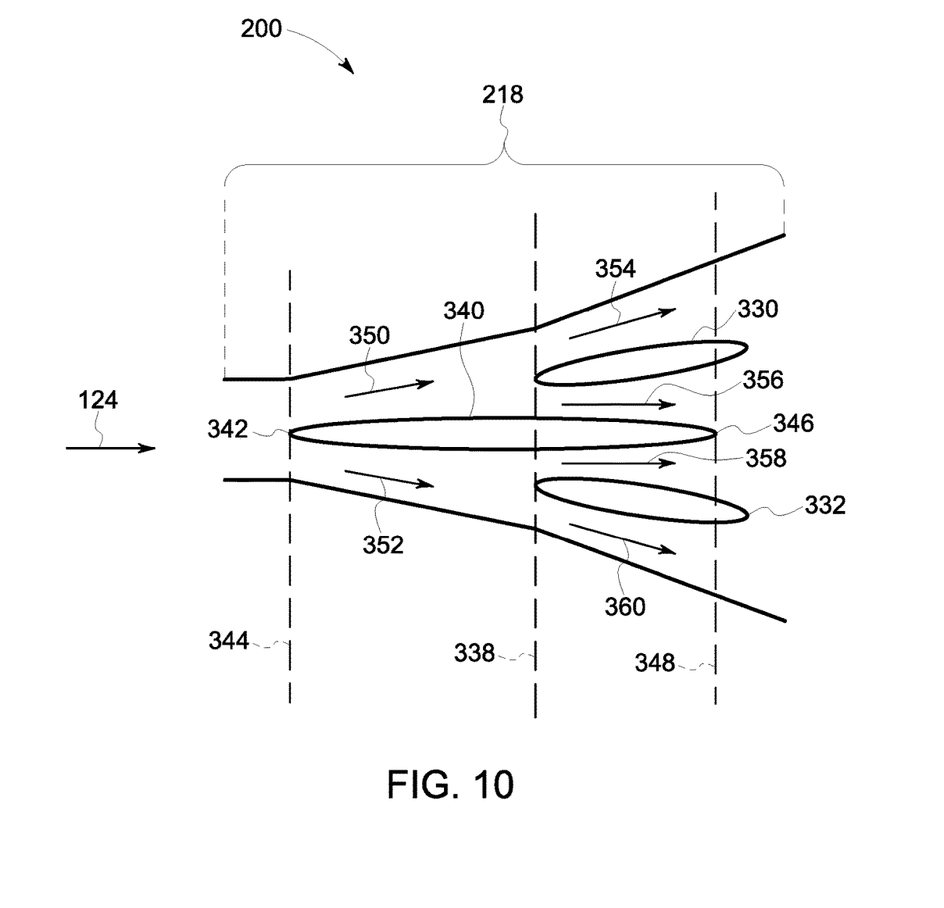
FIG. 10 is a cross-sectional view of an alternative exemplary embodiment of a cooling hole having a bifurcated flow passage in accordance with the present invention.

Referring to FIG. 10, a cross-sectional view of an exemplary embodiment of a cooling hole 200 having an alternative configuration for a bifurcated flow passage is presented. Cooling hole 200 includes first and second vanes 330, 332 having their upstream ends 334, 336 disposed in substantially a first stream position 338. A third vane 340 has a longer length than the first and second vanes 330, 332. The third vane 340 extends longitudinally between the first and second vanes 330, 332.

The third vane 340 has an upstream end 342 disposed in a second stream position 344, the second upstream position 344 being upstream of the first stream position 338. The third vane 340 also has a downstream end 346 disposed in a third stream position 348, the third stream position 348 being downstream of the first stream position 338.

The third vane 340 splits the flow of cooling air 124 into first and second sub-passages 350, 352 of the flow passage 218 at the second stream position 344. The first, second and third vanes 330, 332, 340 work together as a group to split the flow of cooling air 124 into third 354, fourth 356, fifth 358 and sixth 360 sub-passages of the flow passage 218 at the first stream position 338.

Essentially, the embodiment of FIG. 10 bifurcates the cooling hole 200 such that the air flow is split from one stream 124 at the inlet 202, to two streams 350, 352 at the second (more upstream) stream position 344, to four streams 354, 356, 358, 360 at the first stream position 338.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope.

While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled.

In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. .sctn.112, sixth paragraph, unless and until such claim limitations expressly use the phrase "means for" followed by a statement of function void of further structure.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention.

Additionally, while various embodiments of the invention have been described, it is to be understood that aspects of the present invention may include only some of the described embodiments. Accordingly, the invention is not to be seen as limited by the foregoing description, but is only limited by the scope of the appended claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A turbine component comprising;
   an internal surface;
   an external surface; and
   a cooling hole including:
      an inlet disposed on the internal surface,
      an outlet disposed on the external surface,
      a flow passage in fluid communication between the inlet and outlet, the flow passage including:
         a metering section extending from the inlet to a metering end,
         a diffusion zone extending from the metering end to the outlet, and a hood, and
      a vane extending across the flow passage, a portion of the vane disposed within the hooded region, the vane further comprising:
   a plurality of vanes, each vane of the plurality of vanes comprising:
      an upstream end, and
      a downstream end disposed downstream of the upstream end relative to a flow of the cooling air to which the internal surface is exposed, the plurality of vanes further comprising:
   a first vane having its upstream end disposed in a first stream position, the first vane splitting the flow of cooling air at the first stream position into first and second sub-passages;
   second and third vanes having their upstream ends disposed in substantially a second stream position, the second stream position being downstream of the first stream position relative to the flow of cooling air, the second and third vanes splitting the flow of cooling air at the second stream position into third, fourth and fifth sub-passages; and
   fourth, fifth and sixth vanes having their upstream ends disposed in substantially a third stream position, the third stream position being downstream of the second stream position relative to the flow of cooling air, the fourth, fifth and sixth vanes splitting the flow of cooling air at the third stream position int sixth, seventh, eighth and ninth sub-passages,
   wherein each of the first, second and third vanes spans an approximately equal longitudinal distance,
   wherein the first, second, third, fourth, fifth and sixth vanes are entirely disposed within the hooded region, and
   wherein the vane is tapered at both a downstream end and an upstream end.

2. The turbine component of claim 1 wherein the cooling hole comprises:
   a central axis extending from the inlet to the outlet;
   an upstream wall;
   a downstream wall disposed downstream of the upstream wall relative to a flow of mainstream gas to which the external surface is exposed;
   first and second opposing sidewalls interconnecting the upstream and downstream walls to define the flow passage; and
   the vane extending longitudinally relative to the central axis and laterally from one of the first sidewall to the second sidewall and the upstream wall to the downstream wall.

3. The turbine component of claim 1 wherein the cooling hole comprises:
   a central axis extending from the inlet to the outlet;
   an exit plane intersecting a distal end of the hood and oriented perpendicular to the central axis; and
   the hooded region bordered by the metering end of the metering section and the exit plane.

4. The turbine component of claim 1 further comprising:
   an upstream wall;
   a downstream wall disposed downstream of the upstream wall relative to a flow of mainstream gas to which the external surface is exposed;
   first and second opposing sidewalls interconnecting the upstream and downstream walls to define the flow passage,
   wherein at least 50 percent of a longitudinal length of the vane is disposed within the hooded region of the cooling hole,
   wherein the vane further comprises a forward diffusion vane disposed at least partially in the diffusion zone, and
   wherein the forward diffusion vane extends laterally from the first sidewall to the second sidewall.

5. The turbine component of claim 1, wherein the vane further comprises a plurality of vanes,
   wherein each vane of the plurality of vanes is entirely disposed within the hooded region of the cooling hole, and
   wherein each vane of the plurality of vanes spans an approximately equal longitudinal distance.

6. The turbine component of claim 1 wherein the vane comprises:
   a flow splitting portion for splitting a flow of cooling air within the flow passage, the flow splitting portion extending laterally across the entire flow passage and being disposed entirely within the hooded region and metering section of the flow passage; and
   a flow shaping portion for shaping the flow of cooling air prior to reaching the exit of the cooling hole, the flow shaping portion extending beyond the hooded region.

7. The turbine component of claim 1, the vane further comprising at least one arcuate portion, wherein the vane is disposed within the metering section.

8. The turbine component of claim 1 wherein the vane includes at least a one of an acute angle and a curve to divert a flow of cooling air within the flow passage such that a direction of the flow of cooling air does not align with a central axis of the cooling hole.

9. The turbine component of claim 2 wherein the diffusion zone further comprises:
   an alpha section wherein one of the first and second sidewalls diverge laterally at an acute alpha angle relative to the central axis,
   wherein the acute alpha angle is greater than 70 degrees.

10. The turbine component of claim 1 comprising:
wherein each vane of the plurality of vanes has its upstream end disposed substantially in a same stream position relative to the flow of the cooling air, the plurality of vanes splitting the flow of cooling air at the stream position into a plurality of sub-passages within the flow passage.

11. The turbine component of claim 1 comprising:
first and second vanes having their upstream ends disposed in substantially a first stream position;
a third vane extending longitudinally between the first and second vanes, the third vane having:
an upstream end disposed in a second stream position, the second stream position being upstream of the first stream position, and
a downstream end disposed in a third stream position, the third stream position being downstream of the first stream position;
wherein the third vane splits the flow of cooling air into first and second sub-passages of the flow passage at the second stream position; and
wherein the first, second and third vanes split the flow of cooling air into third, fourth, fifth and sixth sub-passages of the flow passage at the first stream position.

12. A turbine component comprising:
an internal surface;
an external surface; and
a cooling hole including:
an inlet disposed on the internal surface,
an outlet disposed on the external surface,
a flow passage in fluid communication between the inlet and outlet, the flow passage including:
a metering section extending from the inlet to a metering end,
a diffusion zone extending from the metering end to the outlet, and
a hooded region defined by a portion of the diffusion zone covered by a hood; and
a plurality of vanes extending across the flow passage, a portion of each vane disposed within the hooded region, the plurality of vanes comprising:
a first vane having an upstream end disposed in a first stream position, the first vane splitting a flow of cooling air at the stream position into first and second sub-passages; and
second and third vanes each having upstream ends disposed in substantially a second stream position, the second stream position being downstream of the first stream position relative to the flow of cooling air, the second and third vanes splitting the flow of cooling air at the second stream position into third, fourth and fifth sub-passages,
wherein the first, second and third vanes are disposed entirely within the hooded region and metering sections.

13. The turbine component of claim 12 comprising:
fourth, fifth and sixth vanes each having upstream ends disposed in substantially a third stream position, the third stream position being downstream of the second stream position relative to the flow of cooling air, the fourth, fifth and sixth vanes splitting the flow of cooling air at the third stream position into sixth, seventh, eighth and ninth sub-passages,
wherein the fourth, fifth and sixth vanes are disposed entirely within the hooded region and metering section.

14. A turbine component comprising:
an internal surface;
an external surface; and
a cooling hole including:
an inlet disposed on the internal surface,
an outlet disposed on the external surface,
a flow passage in fluid communication between the inlet and outlet, the flow passage including:
a metering section extending from the inlet to a metering end,
a diffusion zone extending from the metering end to the outlet, and
a hooded region defined by a portion of the diffusion zone covered by a hood; and
a plurality of vanes extending across the flow passage each vane of the plurality of vanes comprising:
an upstream end, and
a downstream end disposed downstream of the upstream end relative to a flow of the cooling air to which the internal surface is exposed, the plurality of vanes further comprising:
a first vane having its upstream end disposed in a first stream position, the first vane splitting the flow of cooling air at the first stream position into first and second sub-passages;
second and third vanes having their upstream ends disposed in substantially a second stream position, the second stream position being downstream of the first stream position relative to the flow of cooling air, the second and third vanes splitting the flow of cooling air at the second stream position into third, fourth and fifth sub-passages; and
fourth, fifth and sixth vanes having their upstream ends disposed in substantially a third stream position, the third stream position being downstream of the second stream position relative to the flow of cooling air, the fourth, fifth and sixth vanes splitting the flow of cooling air at the third stream position into sixth, seventh, eighth and ninth sub-passages, and
wherein the first, second, third, fourth, fifth and sixth vanes are entirely disposed within the hooded region.

15. The turbine component of claim 14,
wherein the diffusion zone further comprises:
an alpha section wherein one of a first and second sidewalls diverge laterally at an acute alpha angle relative to the central axis; and
a beta section wherein one of an upstream wall and a downstream wall diverge laterally at an acute beta angle relative to the central axis,
wherein the acute alpha angle is a greater than 70 degrees.

16. The turbine component of claim 14, wherein the acute alpha angle is between 20 degrees and 30 degrees.

* * * * *